United States Patent
Amendt et al.

(10) Patent No.: US 6,594,572 B1
(45) Date of Patent: Jul. 15, 2003

(54) DEVICE FOR AUTHORIZING AN UNRESTRICTED OPERATING MODE OF A VEHICLE CONTROL DEVICE IN THE EVENT OF A FAILURE OF THE IGNITION SIGNAL

(75) Inventors: Oliver Amendt, Bühl-Vimbuch (DE); Michael Schindler, Bühl-Neusatz (DE); Rolf Mack, Sinzheim (DE)

(73) Assignees: LuK Getriebe-Systeme GmbH, Buhl (DE); Robert Bosch GmbH, Stuttgart-Feuerbach (DE)

( * ) Notice: Subject to any disclaimer, the term of this patent is extended or adjusted under 35 U.S.C. 154(b) by 0 days.

(21) Appl. No.: 09/254,786

(22) PCT Filed: Jul. 3, 1998

(86) PCT No.: PCT/DE98/01901

§ 371 (c)(1),
(2), (4) Date: May 22, 2001

(87) PCT Pub. No.: WO99/02362

PCT Pub. Date: Jan. 21, 1999

(30) Foreign Application Priority Data

Jul. 10, 1997 (DE) .......................................... 197 29 495

(51) Int. Cl.[7] .............................................. G06F 17/00
(52) U.S. Cl. ......................... 701/48; 307/9.1; 307/10.1
(58) Field of Search .............................. 701/29, 36–49, 701/53, 70; 307/9.1, 10.1, 10.3, 10.6

(56) References Cited

U.S. PATENT DOCUMENTS

| | | | | | |
|---|---|---|---|---|---|
| 593,184 | A | * | 11/1897 | Ochiai et al. ................ | 368/267 |
| 4,493,228 | A | * | 1/1985 | Vukovich et al. ............ | 477/109 |
| 4,702,210 | A | * | 10/1987 | Yasuoka et al. ........ | 123/339.23 |
| RE33,713 | E | * | 10/1991 | Watanabe et al. ........ | 192/103 R |
| 5,101,926 | A | * | 4/1992 | Berman et al. ............. | 180/272 |
| 5,670,831 | A | * | 9/1997 | Georgiades ................. | 180/287 |
| 5,896,083 | A | * | 4/1999 | Weisman, II et al. ....... | 340/438 |
| 6,091,330 | A | * | 7/2000 | Swan et al. ................ | 307/10.6 |
| 6,144,113 | A | * | 11/2000 | Hayashi et al. ............. | 180/287 |
| 6,449,535 | B1 | * | 9/2002 | Obradovich et al. ........ | 165/254 |

* cited by examiner

Primary Examiner—William A Cuchlinski, Jr.
Assistant Examiner—Olga Hernandez
(74) Attorney, Agent, or Firm—Darby & Darby (57) ABSTRACT

A motor vehicle with an automated clutch in its drive train has a clutch control device for controlling the automated clutch and at least a further control device. The clutch control device and the further control device can be activated by means of an activation element which, when the ignition is switched on, sends an ignition signal $V_Z$ to the clutch control device and to the further control device. The clutch control device is or remains activated if at least one of the ignition signal $V_Z$ and an activity signal of the further control device is present.

24 Claims, 7 Drawing Sheets

DEVICE FOR AUTHORIZING AN UNRESTRICTED OPERATING MODE OF A VEHICLE CONTROL DEVICE IN THE EVENT OF A FAILURE OF THE IGNITION SIGNAL

BACKGROUND OF THE INVENTION

The invention relates to a motor vehicle with a plurality of control devices that can be activated through an activation element. When the activation element is in a switched-on condition, it emits an ignition signal $V_Z$ to the control devices, and when the activation element is in a switched-off condition, it does not emit the ignition signal. The control devices, which are in signal communication with each other, are activated by the ignition signal $V_Z$ and deactivated by the absence of the ignition signal $V_Z$.

In motor vehicles of the foregoing description, if the ignition signal fails to reach, e.g., only one of the control devices, this one control device is deactivated while the other control devices are or remain activated. This can have the result that a blown fuse in the ignition circuit of a control device will cause the one control device to become deactivated although the ignition is not in the switched-off condition. The deactivated state of the one control device can affect the proper functioning of the vehicle.

OBJECT OF THE INVENTION

The object of the invention is to provide a device that allows the functions of a motor vehicle to remain operable safely and substantially without restriction even if the ignition signal $V_Z$ fails to reach the input of one of the control devices, as long as the same signal is still being received by one or more of the other control devices.

As a further objective, the invention aims to provide a method by which the functions of a motor vehicle are kept operable safely and substantially without restriction even if the ignition signal $V_Z$ fails to reach the input of one of the control devices, as long as the same signal is still being received by one or more of the other control devices.

SUMMARY OF THE INVENTION

To meet the foregoing objective, the invention provides the concept that at least one of the control devices is designed so that it is not deactivated by the absence of an ignition signal $V_Z$, if the ignition signal $V_Z$ is present in at least one other control device, or if another signal indicating the presence of an ignition signal exists at the one control device. The presence of the ignition signal at the at least one other control device is communicated through a signal connection such as a data bus transmission to the control device that failed to receive the ignition signal. If for example the at least one other control device is an engine control device that regulates the rpm-rate of the engine, the presence of an rpm-signal from the engine, combined with the fact that the engine is running, can be taken as an indication that an ignition signal is present at the engine control device.

In a practical embodiment of the invention, if an ignition signal $V_Z$ is received by the at least one other control device, the latter sends a signal through the signal connection or at least emits a signal indicating or representing the presence of an ignition signal.

Advantageous embodiments of the invention use the concept that the control device is not deactivated in the absence of an ignition signal if a signal from at least one other control device is received that indicates or represents the presence of an ignition signal.

It is likewise advantageous if a control device is allowed to send signals through the signal connection only if an ignition signal is present. This has the advantageous result that a control device will send signals only if an ignition signal is present at that particular control device. Thus, the presence of an ignition signal can be detected alone by the fact that signals are being sent through the signal connection. If a control device detects that signals are being sent from another control device, this means that the sending device is activated and that it is receiving an ignition signal.

According to a practical concept of the present invention, control devices in the activated condition send at least one signal through the signal connection or emit at least one signal. It is further practical, if a control device that is not receiving an ignition signal sends a defined signal through the signal connection which indicates that an ignition signal is not present at that particular control device.

According to a further concept of the invention it can be advantageous if at least two of the following control devices are provided in a motor vehicle and are in signal communication with each other:

- a control device of a clutch with automated clutch-actuation;
- a control device of an engine control;
- a control device of a transmission control;
- a control device of an anti-slip regulation;
- a control device of an anti-lock braking system;
- a control device of a traction control arrangement;
- a control device of a climate control system;
- a control device of a navigation system; or
- another control device.

A further advantageous concept of the invention can be used in a motor vehicle that is equipped with an automated clutch, an engine, a transmission, a clutch control device for controlling the automated clutch, and a unit for determining the rpm-rate $n_{mot}$ of the engine, wherein the clutch control is normally activated by an activation element which sends an ignition signal $V_Z$ to the clutch control device when the ignition is switched on. According to the invention, even if the clutch control device fails to receive an ignition signal, it nevertheless remains activated as long as an engine rpm-signal indicates that the engine rpm-rate $n_{mot}$ is above a predetermined rpm-limit $n_{limit}$.

The following concept of the invention can likewise be used to advantage in a motor vehicle that is equipped with an automated clutch, an engine, a transmission, a clutch control device for controlling the automated clutch, and a further control device, wherein the clutch control device and the further control device are normally activated by an activation element which sends an ignition signal $V_Z$ to the control devices when the ignition is switched on. According to the invention, even if the clutch control device fails to receive an ignition signal, it nevertheless remains activated as long as the clutch control device receives a signal from the further control device indicating that an ignition signal $V_Z$ is present at the further control device.

Another advantageous concept within the scope of the invention can be used in a motor vehicle that is equipped with an automated clutch, an engine, a transmission, a clutch control device for controlling the automated clutch, and a further control device, wherein the clutch control device and the further control device are normally activated by an activation element which sends an ignition signal $V_Z$ to the control devices when the ignition is switched on. According to the invention, even if the clutch control device fails to receive an ignition signal, it nevertheless remains activated as long as the clutch control device receives a signal from the further control device indicating that the further control device is in an activated state.

Yet another advantageous concept within the scope of the invention can be used in a motor vehicle that is equipped with an automated clutch, an engine, a transmission, a clutch control device for controlling the automated clutch, and a further control device, wherein the clutch control device and the further control device are normally activated by an activation element which sends an ignition signal $V_Z$ to the control devices when the ignition is switched on. According to the invention, even if the clutch control device fails to receive an ignition signal $V_Z$, it nevertheless remains activated as long as the clutch control device receives a signal from the further control device indicating that an ignition signal $V_Z$ is present at the further control device and/or that the engine rpm-rate $n_{mot}$ is above a predetermined rpm-limit $n_{limit}$.

Yet another advantageous concept within the scope of the invention can be used in a motor vehicle that is equipped with an automated clutch, an engine, a transmission, a clutch control device for controlling the automated clutch, and a further control device, wherein the clutch control device and the further control device are normally activated by an activation element which sends an ignition signal $V_Z$ to the control devices when the ignition is switched on. According to the invention, even if the clutch control device fails to receive an ignition signal $V_Z$, it nevertheless remains activated as long as the clutch control device receives a signal from the further control device indicating that an ignition signal $V_Z$ is present at the further control device and/or that the further control device is in an activated state.

Yet another advantageous concept within the scope of the invention can be used in a motor vehicle that is equipped with an automated clutch, an engine, a transmission, a clutch control device for controlling the automated clutch, and a further control device. According to the further inventive concept, at least the first control device, when in the activated state, sends signals through a data bus.

A further advantageous concept within the scope of the invention can be used in a motor vehicle that is equipped with an automated clutch, an engine, a transmission, a clutch control device for controlling the automated clutch, and a further control device. According to the further inventive concept, the first control device sends signals through a data bus, if a signal is present that indicates that the further control device is in an activated state.

The following concept according to the invention can likewise be used in a motor vehicle that is equipped with an automated clutch, an engine, a transmission, a clutch control device for controlling the automated clutch, and a further control device. According to the inventive concept, the first control device sends signals through a data bus if an engine-rpm signal is present indicating that an engine rpm-rate exceeds an rpm-limit.

Under a further advantageous concept of the invention, the first control device sends a starter release signal through the data bus when the transmission is shifted into the neutral position.

It is likewise advantageous according to the invention, if the control device that controls the engine starts up the vehicle engine if a starter release signal is present and an engine-start operation is initiated by the driver.

In the embodiments and concepts described herein, the control device referred to as "other" or "further" control device is advantageously represented by one of the following control devices:

a control device of an engine control;

a control device of a transmission control;

a control device of an anti-slip regulation;

a control device of an anti-lock braking system;

a control device of a traction control arrangement;

a control device of a climate control system;

a control device of a navigation system; or another control device.

It is likewise advantageous if at least one control device is an electronic control device with a microprocessor.

It is further advantageous if the signal connection is a data bus connection. It is particularly useful if the signal connection is a CAN-bus (Central Area Network bus) connection.

It is further practical if at least one of the following elements is used as activation element:

an ignition switch for switching on the ignition of the vehicle;

a vehicle brake operating element, such as a pedal and/or handle;

a transponder code card.

It is further practical if, prior to its deactivation, the control device of the automated clutch moves the clutch into engagement, which has the effect of a parking lock if the transmission is in gear. It is likewise advantageous if a variable predeterminable length of time lies between the engagement of the clutch and the deactivation of the control device. The length of the time interval can be a function of vehicle parameters.

It is likewise practical if the at least one signal which indicates or represents the presence of an ignition signal is constituted by one of the following signals:

an ignition signal $V_Z$ an activity signal of a control device an engine rpm-rate signal $n_{mot}$ a throttle valve signal a fuel-injection rate signal an engine torque signal $M_{mot}$ a wheel rpm-rate signal $n_{wheel}$ a transmission rpm-rate signal $n_{trsm}$.

A further concept of the invention relates to a method for controlling subsystems in the drive train of a motor vehicle such as an automated clutch, with at least one control device for controlling the operation of the automated clutch and at least one other control device wherein the control devices are activated when a switching element is switched on and deactivated when the switching element is switched off. The inventive method includes at least some of the following steps:

interrogating whether an ignition signal or an engine rpm-rate signal is present at the at least one control device;

leaving the control device activated if at least one of the two signals is present;

emitting no signals from the control unit through a data bus if neither of the two signals is present;

deactivating the control unit if neither of the two signals is present.

A further embodiment of the foregoing inventive method, likewise, relates to the control of subsystems in the drive train of a motor vehicle such as an automated clutch, with at least one control device for controlling the operation of the automated clutch and at least one other control device wherein the control devices are activated when a switching element is switched on and deactivated when the switching element is switched off. The inventive method includes at least some of the following steps:

- interrogating whether an ignition signal, engine rpm-rate signal and/or and engine control activity signal is present at the at least one control device;
- leaving the control device activated if at least one of the ignition signal, the engine rpm-rate signal, or the engine activity signal is present;
- emitting no signals from the control unit through a data bus in the absence of the ignition signal if neither the engine rpm-rate signal nor the engine activity signal is present;
- deactivating the control unit in the absence of the ignition signal if neither the engine rpm-rate signal nor the engine activity signal is present.

In a practical embodiment of the invention, the control device is a control device for controlling the automated clutch. Prior to deactivation of the control device the clutch is moved into engagement.

It is likewise advantageous if a waiting time is observed prior to the deactivation of the control device. It is particularly advantageous if a waiting time is observed prior to the engagement of the clutch. The length of either of the waiting periods can be dependent on at least one operating parameter of the vehicle.

The device according to the invention ensures that a safe operation of the automated clutch is maintained if the ignition signal fails to be received at the input of the control device of the automated clutch. A further embodiment ensures a safe switching-on or restarting of the engine after it has been switched off even if at least the control device of the automated clutch is not receiving the ignition signal.

The invention further relates to a motor vehicle with a plurality of control devices which are activated through an activation element which sends out an ignition signal $V_Z$, wherein the control devices are in signal connection with each other and mutually monitor each other, wherein at least one control device is not caused to be deactivated by the absence of an ignition signal $V_Z$ as long as an ignition signal $V_Z$ is present in at least another control device or if the at least one control device is receiving another signal indicating the presence of an ignition signal.

BRIEF DESCRIPTION OF THE DRAWINGS

Embodiments of the invention will be explained below in further detail with reference to the drawings, wherein.

DETAILED DESCRIPTION OF PREFERRED EMBODIMENTS

Figure 1:
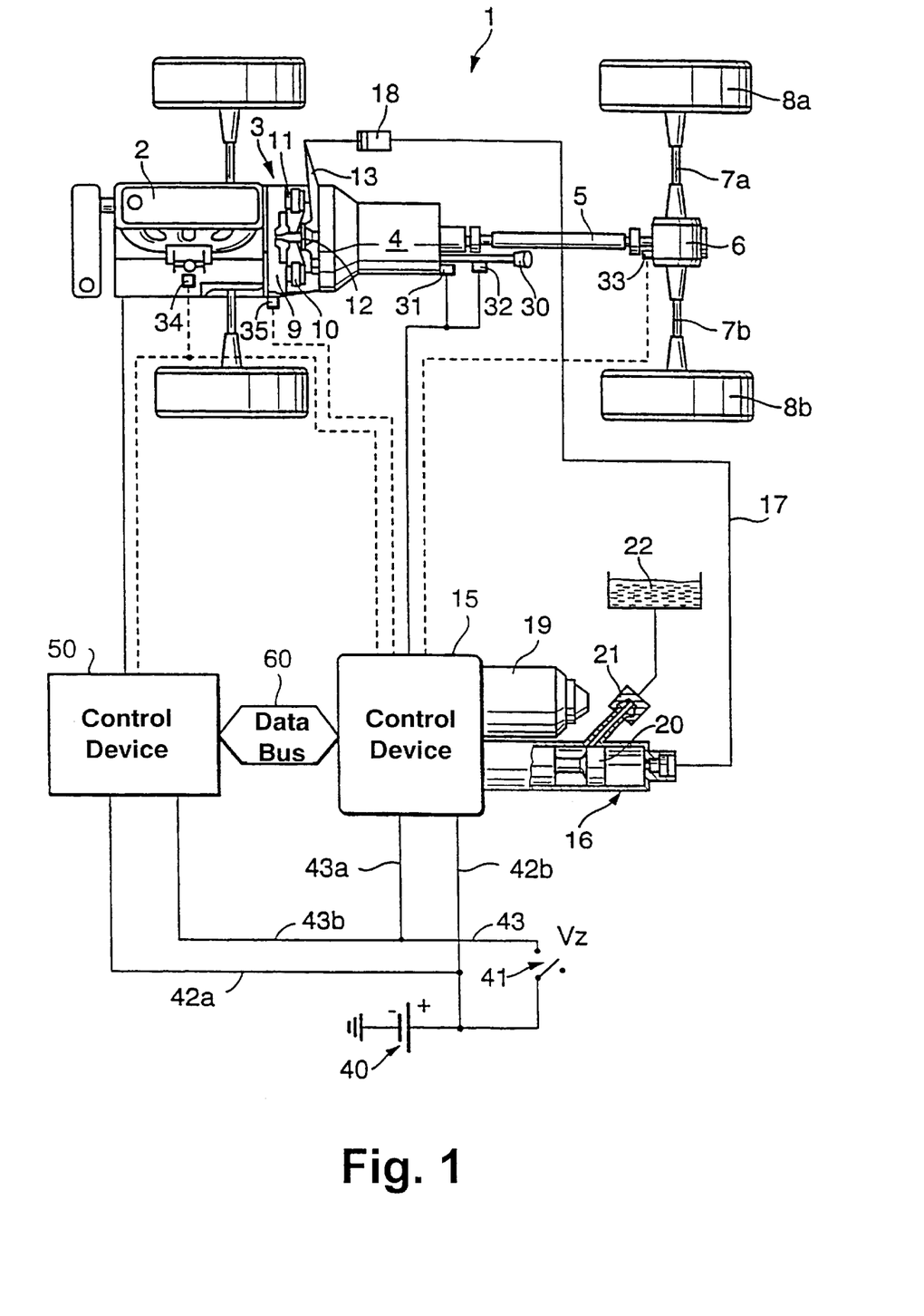
FIG. 1 shows a diagrammatic illustration of a motor vehicle.

FIG. 1 illustrates a motor vehicle 1 with a drive source 2 such as an internal combustion engine or a hybrid combination of an internal combustion engine and an electric motor. In the drive train of the motor vehicle, the drive source 2 is followed by a clutch 3, a transmission 4, a drive shaft 5, and a differential 6 driving two drive shafts 7a and 7b which, in turn, drive the driven wheels 8a and 8b. The clutch 3 is represented by a dry friction clutch that is mounted on a flywheel, with a pressure plate 10, clutch disc release bearing 12 and release fork 13. The release fork is actuated by means of an actuator 15 with a master cylinder 16, a pressure-medium conduit such as a hydraulic line 17, and a slave cylinder 18. The actuator is provided with a snifting channel 21 that is connected to a reservoir 22 for the pressurized medium. The actuator is configured as a pressure medium-based actuator with an electric motor 19 driving the master cylinder piston 20 through a gearbox so that the torque transfer through the clutch can be controlled through the pressurized medium conduit 17 and the slave cylinder 18.

Furthermore the actuator 15 comprises a control device with an electronic control unit for controlling or regulating the operation of the clutch by means of the actuator. The power electronics and/or the control electronics can be accommodated inside the actuator housing, but they could also have their own separate housings.

The vehicle 1 with transmission 4 has a gear shift lever 30 with a gear-identification sensor 31 and/or shift-intent sensor 32 mounted on the transmission or on the shift lever. The gear-identification sensor serves to detect which gear is engaged, while the shift-intent sensor detects conditions that indicate a driver's intention to shift gears, which manifests itself through a movement of the shift lever and/or a force exerted on the shift lever. The vehicle is further equipped with an rpm-sensor 33 which detects the rpm-rate of the transmission output shaft or the driven wheels. A throttle valve sensor 34 detects the position of the throttle valve, and an rpm-sensor 35 detects the engine rpm-rate.

The gear-identification sensor directly or indirectly detects the position of shift elements inside the transmission, or it detects which gear is engaged in the transmission so that based on the sensor signal, at least the currently engaged gear is registered by the control unit. Furthermore, if the sensor is based on an analog principle, the movement of the shift elements inside the transmission can be detected so that the next gear that is about to be engaged can be identified early.

The actuator 15 is supplied by a battery 40 that has a permanent connection 42b with the actuator. By connecting the battery to the actuator 15 through the ignition switch 41, the control unit is activated and the microcomputer of the control unit is put into operation. An ignition signal $V_Z$ indicating that the ignition switch is in the "ON" position is present at the ignition input of the control unit 15. As a rule, the ignition lock device has a multi-stage ignition switch 41 that is operated by means of the ignition key. In a first position of the switch, the control unit is activated by the presence of the ignition signal $V_Z$, and in a second position of the switch a starter of the combustion engine 2 can be switched on by way of the electronic engine control unit 50 to start up the engine.

When the ignition switch 41 is turned off, all of the control devices of the automated clutch, the engine and other units, if there are any, are switched off as there is no longer an ignition signal present at the control devices.

The control devices 15 and 50 are connected to the power supply 40 through the permanent connections 42a, 42b and the switchable connections 43a, 43b. The control devices are activated when the switch 41 is closed, so that an ignition signal $V_Z$ is received by the control devices.

As a rule, there are fuses arranged in the circuit between the ignition switch and the control devices to protect the power-consuming devices. The fuses are symbolically indicated at 103, 105, 107, 109 in FIG. 2.

A data bus connection 60, such as for example a CAN-bus, is arranged between the individual control devices of the motor vehicle. The control devices send and/or receive signals through the data bus, such as control commands, status signals, or sensor data. For example, the engine control unit can detect the engine rpm-rate and share the information through the data bus with the other control devices so that the same data do not have to be determined again by the other control devices.

Figure 2:
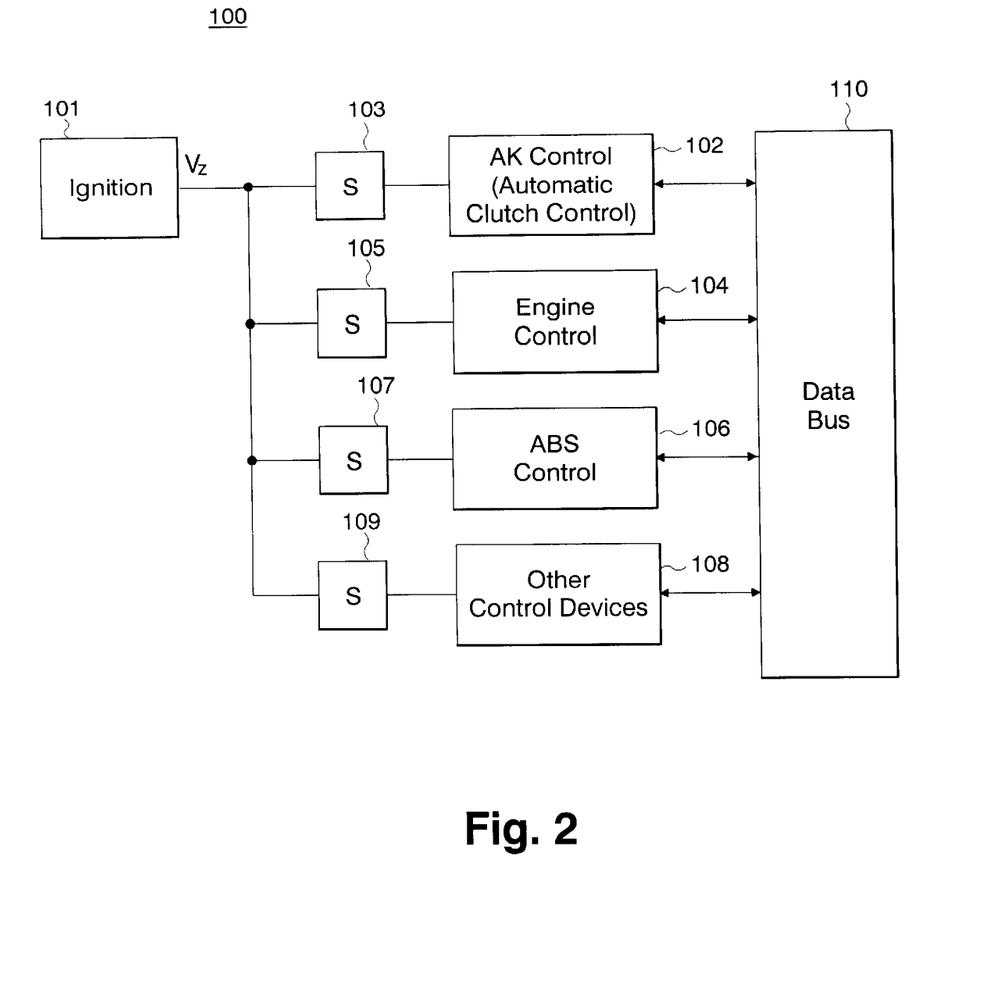
FIG. 2 represents a block diagram.

The block diagram 100 of FIG. 2 illustrates the overall circuit structure of the control devices. The control devices are switched on by an ignition switch 101 in the position "Ignition on" and switched off in the position "Off". If the ignition switch is switched through the position "Ignition on" into the "engine start" position, the engine is started up by the starter. The control devices of the automated clutch control 102, the engine control 104, the ABS-control 106 (anti-lock braking system) and other control devices 108 are shown as examples of control devices. Each of the control devices is connected through a fuse (103, 105, 107, 109) to the ignition switch so that the individual devices are electrically protected. Furthermore, the control devices communicate through the data bus 110 with each other and send and receive data and signals through the data bus.

If one of the fuses 103 to 109 fails, the respective control device receives the same signal or absence of a signal as if the ignition had not been switched on or had been switched off again.

The invention proposes an arrangement where, e.g., if the fuse 103 of the clutch control device 102 fails during operation of the vehicle so that the control device no longer receives the ignition signal $V_Z$, the control device 102 will recognize that the signal interruption was not caused by turning off the ignition but is due to another cause, such as for example a malfunction.

The foregoing concept can be realized, e.g., by using the fact that at least some of the individual control devices communicate through a data bus, such as a CAN-bus and that despite the failure or absence of the ignition signal $V_Z$ at the clutch-control device 102, the other control devices are still operating and continue to send and/or receive data through the data bus. For example, the engine rpm-rate regulated by the engine control 104 can be detected or received through the data bus and interpreted as an indication that an ignition signal $V_Z$ is present at the other control devices.

Another example of a signal that can serve as an indication for the presence of an ignition signal $V_Z$ is the wheel rpm-signal of the ABS control device.

Furthermore, the data bus signals of the different devices can be monitored since the control devices send data through the data bus together with a device identification. If no ignition signal $V_Z$ exists at one of the control devices, the latter can cease sending data through the data bus, but the data traffic from the other control devices on the data bus can continue. If, e.g., one control device is not sending data, this can be interpreted by other control devices as an indication that no ignition signal $V_Z$ exists at the silent control device.

An ignition signal $V_Z$ is received by a control device if the ignition is switched on and the electrical connection to the control device is not interrupted. As described above, an interruption can be caused by a blown fuse and/or by another fault such as for example a break in the cable.

Figure 3:
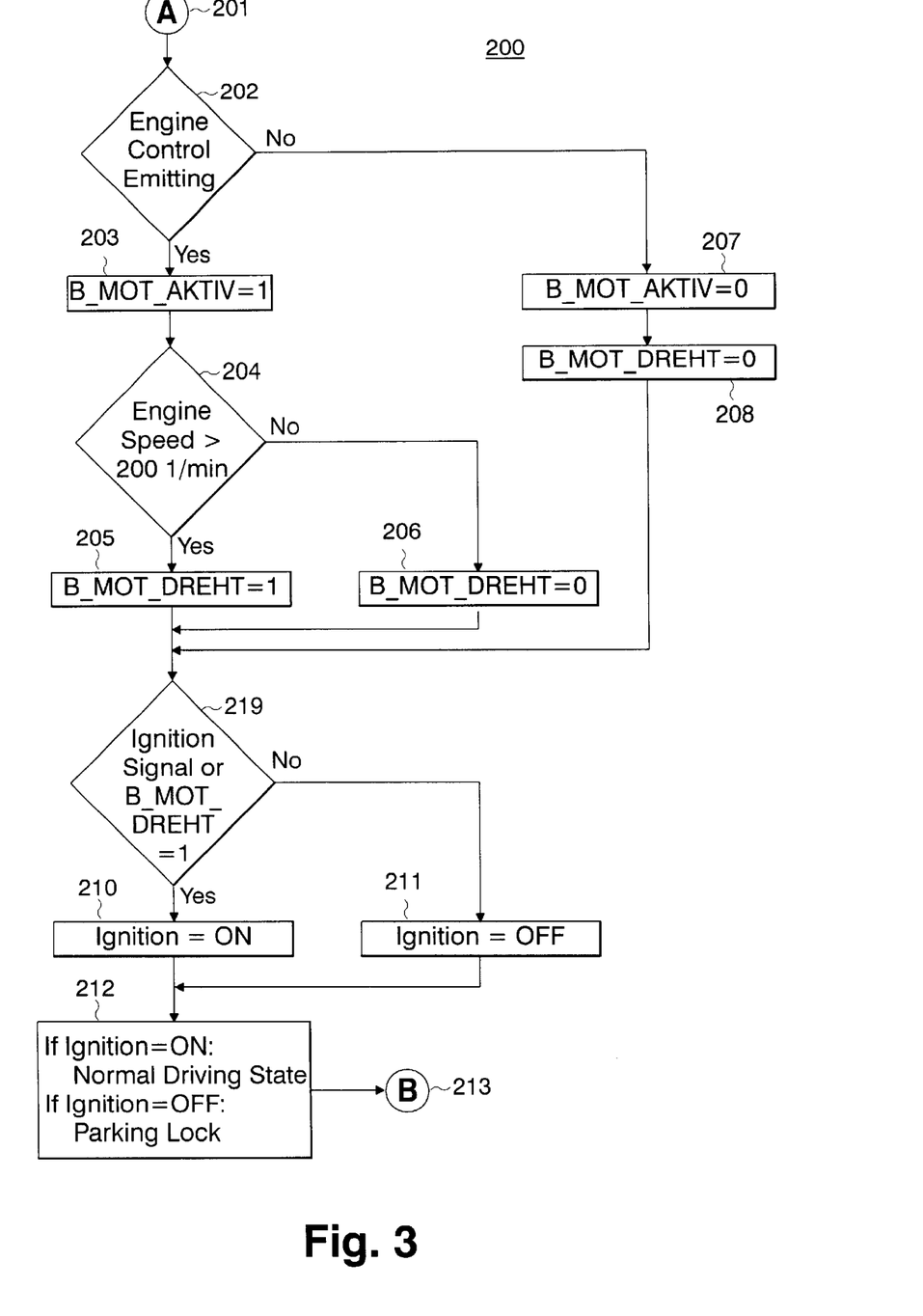
FIG. 3 represents a flowchart.

The flowchart 200 of FIG. 3 illustrates the sequence of operations performed by an embodiment of a device according to the invention and at the same time illustrates an embodiment of a method according to the invention.

The process starts in step 201 and repeats itself with each clock cycle of the control, for example every 10 ms. In step 202 the control device of the automated clutch performs a yes/no test on whether or not the engine control device is sending data to the data bus, e.g., to a CAN-bus. In the affirmative case, i.e., if signals of the engine control unit are present on the data bus, the process continues at step 203, otherwise the process continues at step 207.

In one embodiment, the yes/no decision in step 202 can be independent of the nature of the data being sent by the engine control unit.

In another embodiment of the invention, if data are being sent by the engine control unit but all data are equal to zero in each successive cycle of the process, this is interpreted as an indication that the engine control unit is inactive, i.e., a negative outcome of step 202.

In the affirmative case of step 202, the engine control activity bit B_MOT_AKTIV in the control device is set to 1 in step 203 of the process.

Step 204 represents another yes/no decision on whether the engine rpm-rate exceeds a limit of, e.g., 200 rpm. The affirmative case means that the engine is running. In step 205, the bit B_MOT_RUNNING is therefore set to 1. The negative case of step 204 is interpreted as a non-running state of the engine; the process continues in step 206, where the bit B_MOT_RUNNING is set to 0.

In the negative case of step 202, the process continues in step 207 where the bit B_MOT_AKTIV is set to zero, continuing with step 208 where the bit B_MOT_RUNNING is likewise set to zero. In this state, the engine control is inactive, and the engine is either not running at all or is running slower than the limit of 200 rpm. The 200 rpm limit is given only as an example of a limit in the range from 100 rpm to 500 rpm, i.e., an rpm-rate that is clearly below the idling rate of the engine.

Step 209 represents a test as to whether the ignition signal $V_Z$ from, e.g., the ignition switch is present at the control unit 102 or whether the bit B_MOT_RUNNING=1 is set. If either one or both of these conditions are present (affirmative), the operating state of the ignition is interpreted as "ON" in step 210. If neither of the conditions is present in step 209 (negative case), the operating state of the ignition is interpreted as "OFF" in step 211. In step 212, if the ignition has been found to be "ON", the control device follows a program routine or strategy for normal driving operation. This means, e.g., when taking off from a standstill, the clutch is moved into engagement; in preparation for a gear change the clutch is disengaged; after completing the gear change the clutch is re-engaged; or when the vehicle is slowing down to a stop the clutch is taken out of engagement. Also in step 212, but in the case where the ignition has been found to be "OFF", the clutch is put into engagement so that with a gear engaged in the transmission, the vehicle is effectively secured in a parking-lock condition and thereby prevented from unintentionally rolling away. Further process steps (not shown) in the control sequence of the clutch operation follow after 213.

Figure 4:
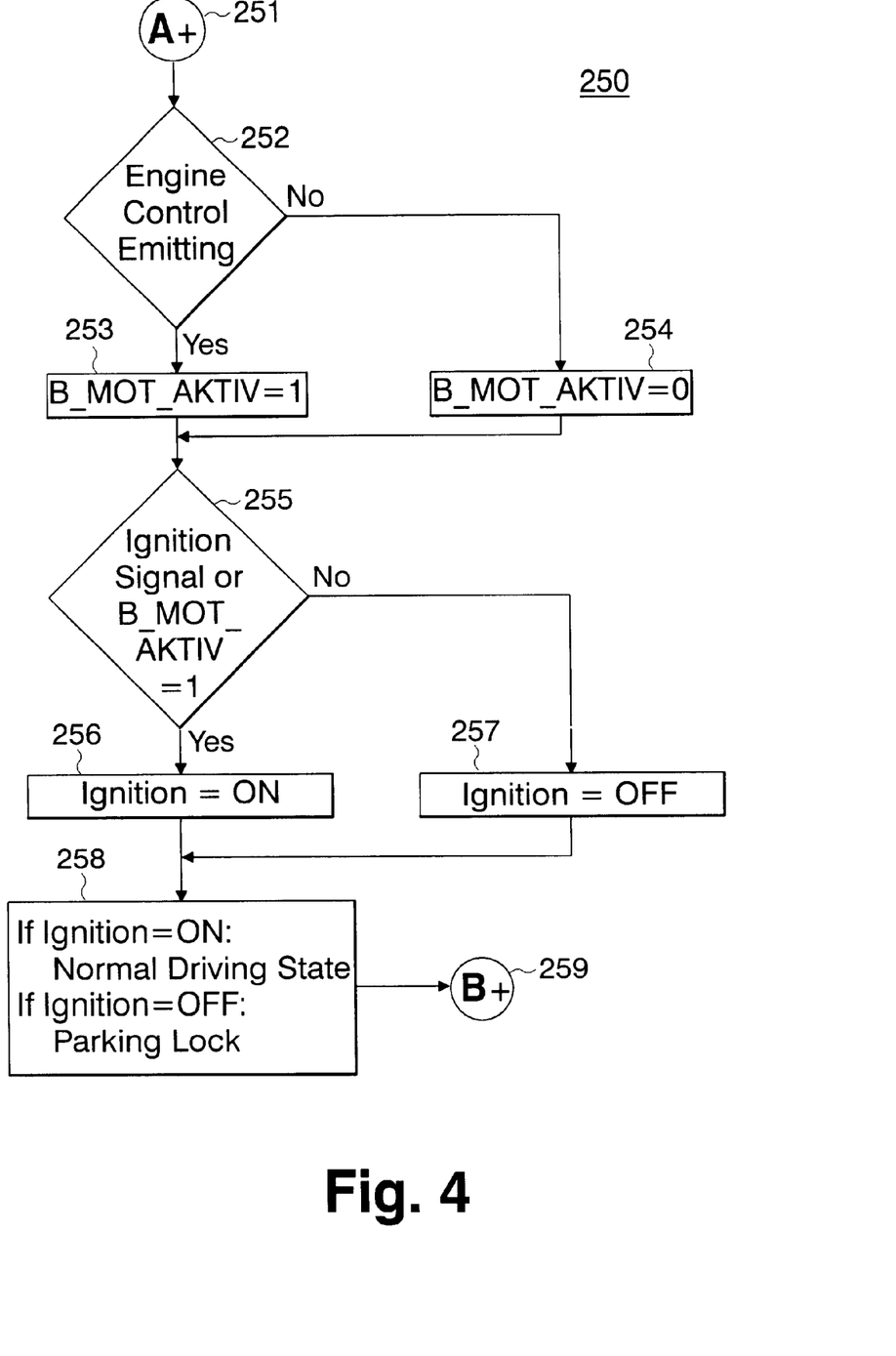
FIG. 4 represents a flowchart.

The flowchart 250 of FIG. 4 illustrates the sequence of operations performed by an embodiment of a device according to the invention and at the same time illustrates an embodiment of a method according to the invention.

The process starts in step 251 and repeats itself with each clock cycle of the control, for example every 10 ms. In step 252 the control device of the automated clutch performs a yes/no test on whether or not the engine control device is sending data to the data bus, e.g., to a CAN-bus. In the affirmative case, i.e., if signals of the engine control unit are present on the data bus, the process continues at step 253, otherwise the process continues at step 254.

In the affirmative case of step 252, the engine control activity bit B_MOT_AKTIV in the control device is set to 1 in step 253 of the process.

In the negative case of step 252, the process continues in step 254 where the bit B_MOT_AKTIV is set to zero. In this state, the engine control is inactive.

Step 255 represents a test as to whether the ignition signal $V_Z$ from, e.g., the ignition switch is present at the control unit 102 or whether the bit B_MOT_RUNNING=1 is set. If either one or both of these conditions are present (affirmative), the operating state of the ignition is interpreted as "ON" in step 256. If neither of the conditions is present in step 255 (negative case), the operating state of the ignition is interpreted as "OFF" in step 257. In step 258, if the ignition has been found to be "ON", the control device follows a program routine or strategy for normal driving operation. This means, e.g., when taking off from a standstill the clutch is moved into engagement; in preparation for a gear change the clutch is disengaged; after completing the gear change the clutch is re-engaged; or when the vehicle is slowing down to a stop the clutch is taken out of engagement. Also in step 258, but in the case where the ignition has been found to be "OFF", the clutch is put into engagement so that with a gear engaged in the transmission, the vehicle is effectively secured in a parking-lock condition and thereby prevented from unintentionally rolling away. Further process steps (not shown) in the control sequence of the clutch operation follow after 259.

Figure 5:
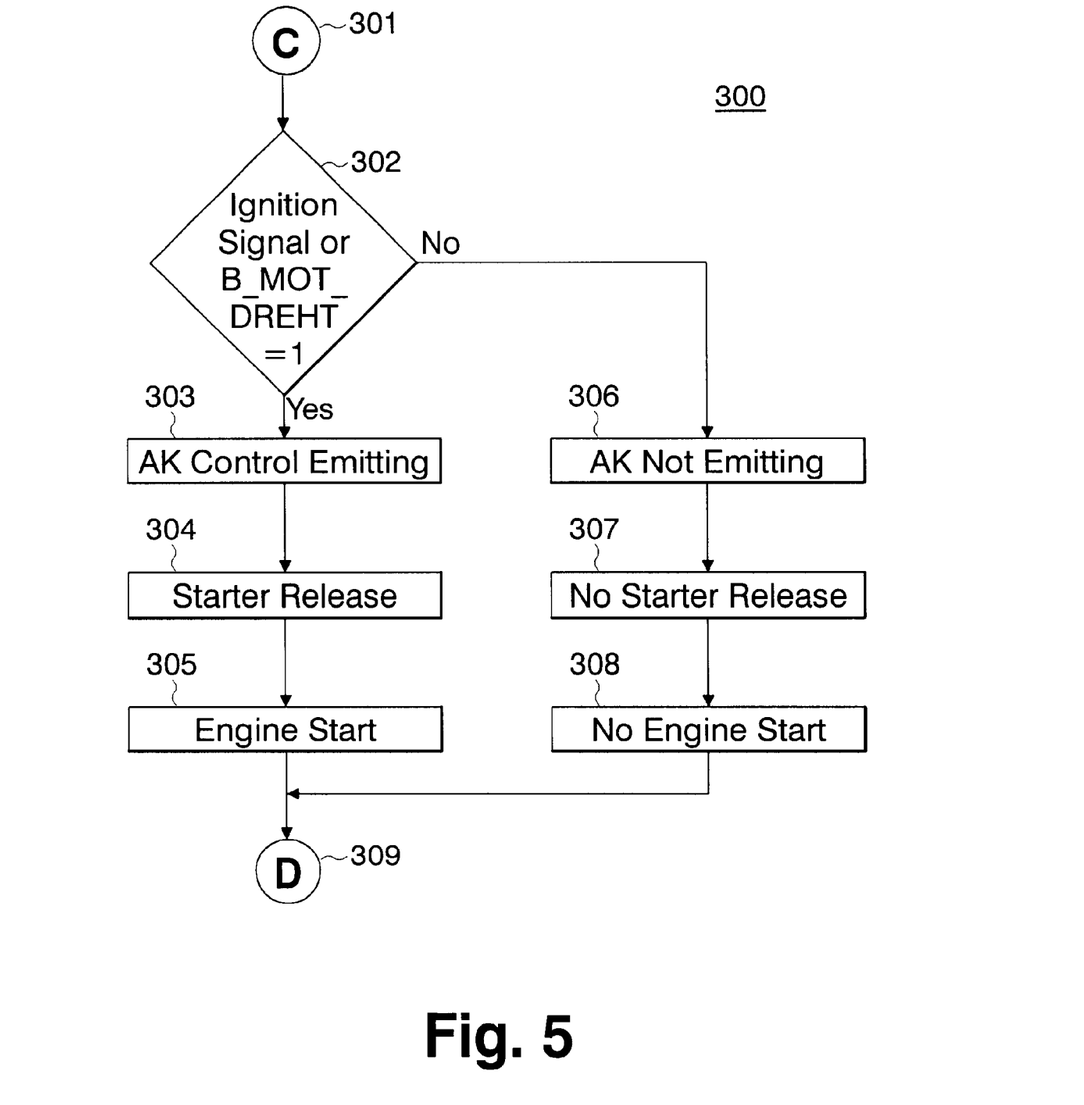
FIG. 5 represents a flowchart.
Figure 6:
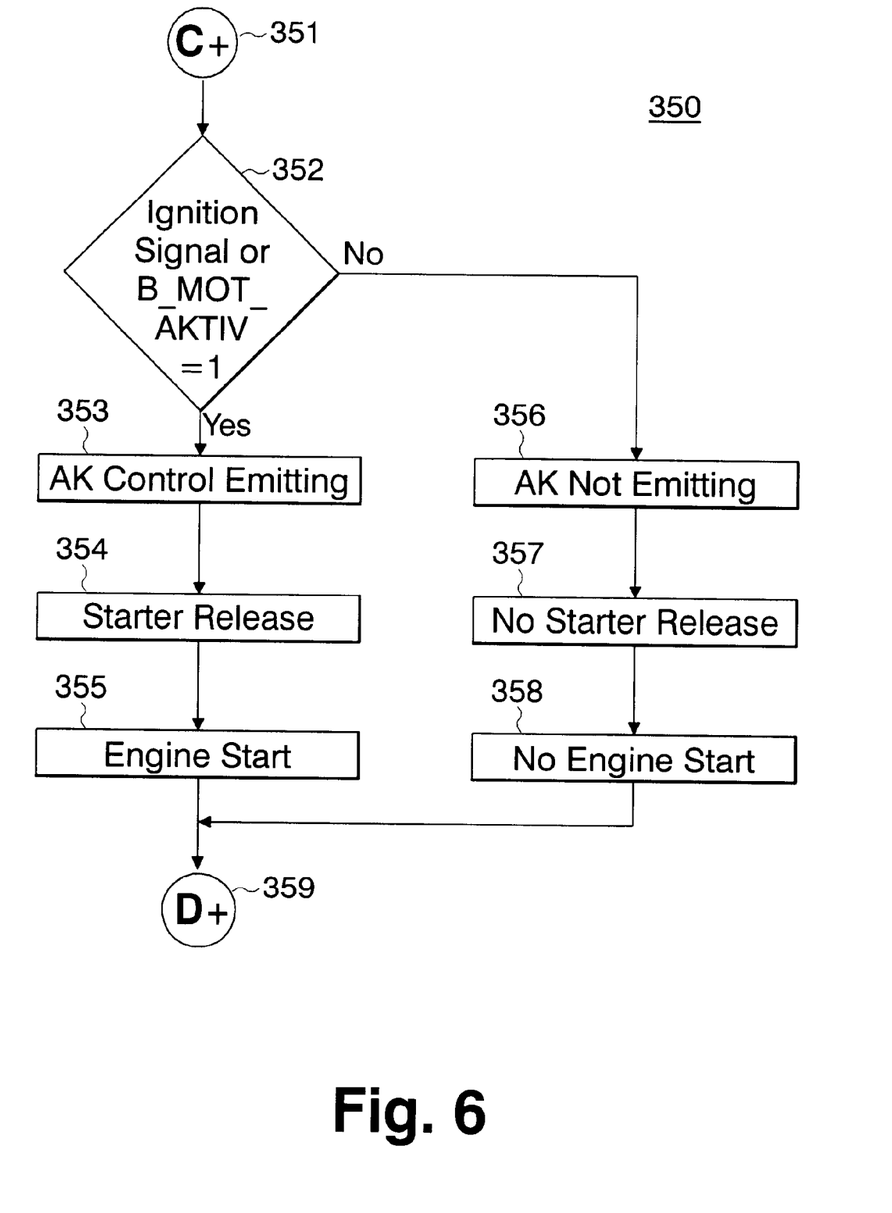
FIG. 6 represents a flowchart.

The flowcharts 300 and 350 of FIGS. 5 and 6, respectively, illustrate sequences of operations performed by embodiments of a device according to the invention and at the same time illustrate embodiments of methods according to the invention.

In step 301 of FIG. 5, the respective processes whose description was ended at step 213 of FIG. 3 or step 259 of FIG. 4 are continued. Step 302 represents a test as to whether the ignition signal $V_Z$ is present and/or whether the bit B_MOT_RUNNING=1 is set. In the affirmative case of step 302, the control device of the automated clutch sends signals to the data bus (CAN bus) in step 303. Subsequently in step 304, the control device releases the starter, e.g., under the conditions that the transmission is in the neutral position and the engine is not running. The starter release signal is sent through the CAN-bus. After the engine control device receives the starter release signal and the driver turns the ignition key to the engine start position, the engine is started in step 305. In the negative case of step 302, the process passes to step 306 where the control device of the automated clutch is blocked from sending signals to the data bus. In step 307, the control unit sends no starter release signal, even if the transmission is in neutral and the engine is not running. If a starter release signal is set, the engine control unit does not receive it, because it is not being sent, and the engine is therefore not being started even if the ignition key is turned into the engine start position by the driver in step 308. At step 309 the process continues through further steps that are not shown in FIG. 5.

In step 351 of FIG. 6, the respective processes whose description was ended at step 213 of FIG. 3 or step 259 of FIG. 4 are continued. Step 352 represents a test as to whether the ignition signal $V_Z$ is present and/or whether the bit B_MOT_AKTIV=1 is set. In the affirmative case of step 352, the control device of the automated clutch sends signals to the data bus (CAN-bus) in step 353. Subsequently in step 354, the control device releases the starter, e.g., under the conditions that the transmission is in the neutral position and the engine is not running. The starter release signal is sent through the CAN-bus. After the engine control receives the starter release signal and the driver turns the ignition key to the engine start position, the engine is started in step 355. In the negative case of step 352, the process passes to step 356 where the control device of the automated clutch is sending signals to the data bus. In step 357, the starter release signal is set to the blocked condition, even if the transmission is in neutral and the engine is not running. Without the starter release signal, the engine will not start even if the ignition key is turned into the engine start position by the driver in step 358. At step 359 the process continues through further steps that are not shown in FIG. 6.

The embodiments of FIGS. 5 and 6 have the advantage that the driver can start the engine and put the vehicle in motion even if there is no ignition signal $V_Z$ present at one of the control devices after the ignition has been switched on. Without the benefit of the inventive arrangement, the driver would in the event of a failure, for example in an electric cable or a fuse, no longer be able to start up the engine and the vehicle would be inoperative as a result of the failure.

A presence of a fault can be detected from the fact that the ignition signal $V_Z$ is absent only at one control device but is present in at least one other control device or all other control devices. If the control devices are connected through a signal connection such as a data bus and data and signals are exchanged through the data bus, the control device that lacks the ignition signal recognizes that the ignition signal is present at the other control devices, because they are sending signals to the data bus. In this situation the activity of the control device that lacks the ignition signal is carried out so that as long as ignition signals are present at the other control devices, the absence of the ignition signal is ignored and instead the activity of the other control devices sending signals over the data bus is taken as an indication for the presence of an ignition signal. If the ignition is actually switched off by the driver, none of the control devices is sending data over the data bus. Based on the absence of data communication on the data bus, the control devices will identify a general absence of an ignition signal and turn themselves off automatically. The switch-off can also occur with a time delay during which the control devices continue to check whether data are sent to the bus. In another embodiment, a control device does not cease to send data to the data bus in order to indicate the absence of an ignition signal, but instead sends predefined signals such as, e.g., zeroes which carry the meaning of that no ignition signal is present at the control device.

With some embodiments, an operating phase of the motor vehicle that was started while an ignition signal was present can be completed after the failure of the ignition signal of the control device of the automated clutch while full driving functionality is maintained. Under this concept, a CAN signal IDxxx, e.g., as an identifier of the engine control device, is monitored in addition to the ignition signal of the automated clutch. As long as the engine control device sends an engine rpm-rate greater than for example 210 rpm along with the IDxxx signal, the control device of the automated clutch maintains the normal working mode even in the absence of an ignition signal. The failure of the ignition signal at the control device of the automated clutch is indicated to the driver of the vehicle for example through a signal in the instrument panel of the vehicle or by a failure of the gear indicator which indicates the currently engaged gear. The control device of the automated clutch sends signals through a signal connection such as the CAN bus only when the ignition signal is present at the clutch control device.

For example, if there is no ignition signal at the input of the control device of the automated clutch during 5 successive interrupts (e.g., 10-millisecond cycles) of the control device of the automated clutch and the engine control device sends, e.g., an engine rpm-signal of less than 210 rpm for three 20-millisecond cycles of the engine control, the control device of the automated clutch may be programmed to recognize the condition "ignition OFF". At this point, a predefined "parking lock" function is activated and the clutch is moved into engagement.

After a run-out period that depends on the engine rpm-rate, the control device of the automated clutch switches off completely. A new start of the engine after a failure of the ignition signal is not possible with the preceding embodiment.

Under the foregoing strategy, the control of the automated clutch is substantially dependent on the engine rpm-signal during the shut-down period of the engine control device, i.e., after "ignition OFF". As long as the engine control sends an rpm-signal greater than a threshold value in the range of 100 to 500 rpm, for example 210 rpm, the control device of the automated clutch detects an "ignition ON" even though no ignition signal is present at the clutch-control device. Therefore, the clutch-control device keeps the automated clutch operative during the shut-down period of the engine-control device.

The invention provides the following concepts for signals to be sent by the engine control device after receiving an "ignition OFF" signal:

1. The engine control device sends no signals on the CAN bus after "ignition OFF". The control device of the automated clutch recognizes the state "ignition OFF" as soon as the ignition is actually switched off. The run-out time of the engine—i.e., the delay time for engaging the clutch under the parking-lock function—is calculated from the engine rpm-signal last sent prior to "ignition OFF", such as for example 850 rpm. The clutch control device is programmed to apply the correct amount of delay time compatible with this last rpm-signal.
2. The engine control device sends an rpm-signal of 0 rpm during the shut-down period. The control device of the automated clutch recognizes immediately after the "ignition OFF" signal that the ignition switch has been turned off and activates the parking lock by engaging the clutch with a time delay. The run-out time period of the engine is calculated from the last rpm-rate of the engine prior to switching off the ignition, e.g. 850 rpm. The clutch control device is programmed to apply a safe amount of delay time compatible with this last rpm-signal.
3. The engine control device sends the actual rpm-rate during the run-out period. The control device of the automated clutch does not recognize the "ignition OFF" condition until the engine rpm-rate has fallen below the limit of, e.g., 210 rpm. The run-out time period of the engine is calculated from the last rpm-rate before passing through the 210 rpm threshold, e.g. 211 rpm. The clutch control device is programmed to apply a safe amount of delay time compatible with this last rpm-signal.

Figure 7:
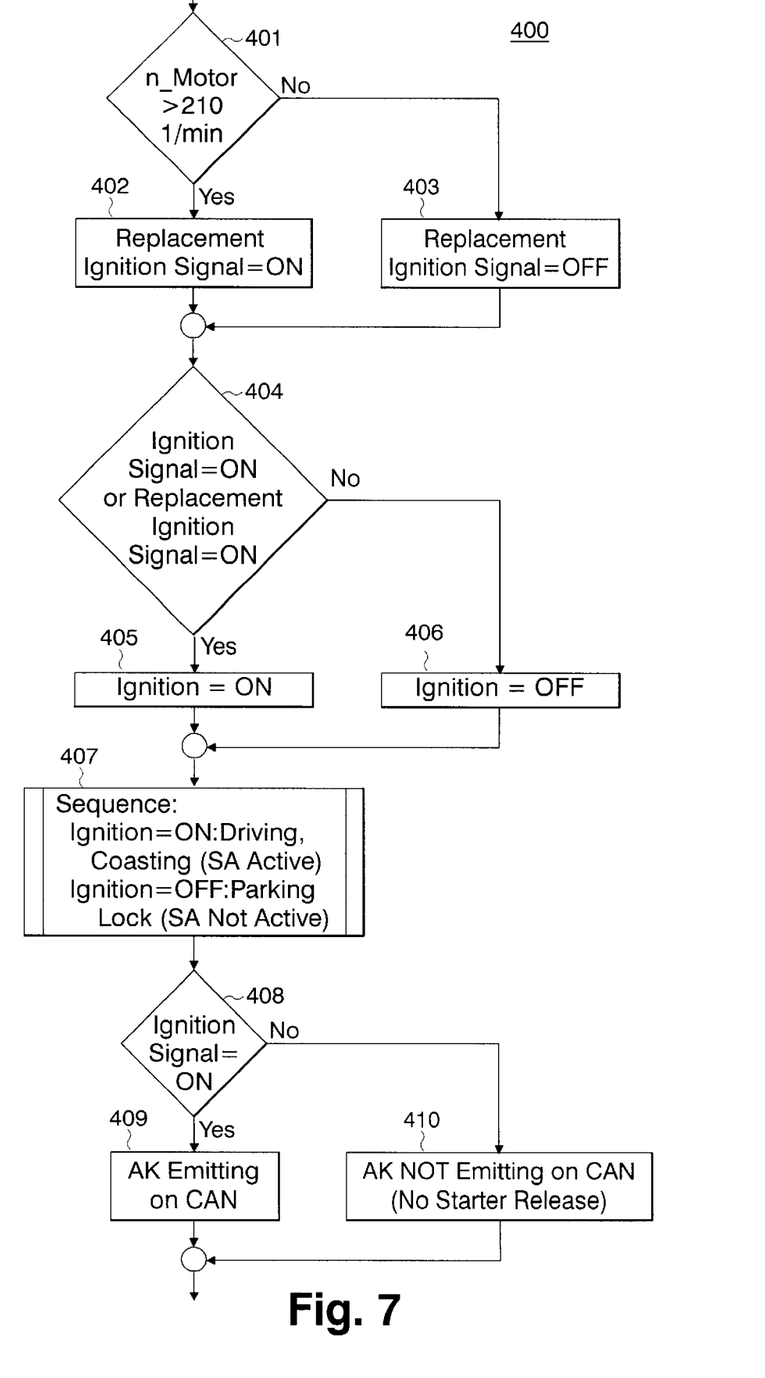
FIG. 7 represents a flowchart.

FIG. 7 represents a flowchart diagram to illustrate an embodiment of the invention. Step 401 represents a test as to whether the engine rpm-rate n_Motor is greater than a predetermined limit, in this case 210 rpm. In the affirmative case of step 401, a substitute ignition signal such as bit flag "ON" is set at 402. In the negative case of step 401, the substitute ignition signal is set to "OFF" at step 403. Step 404 represents a test as to whether the ignition signal or the replacement signal is set to "ON". In the affirmative case of step 404, the operating state of the ignition is registered as "ON" in step 405. In the negative case of step 404, the operating state of the ignition is registered as "OFF" in step 406. In block 407 the currently applicable operating strategy is carried out. If the ignition flag is set to "ON", the control strategy for driving, shifting, starting off, coasting, braking and stopping, etc., is carried out, and the shift-intent detection is operative. If the ignition flag is set to "OFF", the clutch is engaged after a predetermined time delay to immobilize the vehicle in a parking-lock condition. The shift-intent detection is deactivated, which means that the clutch does not move out of engagement when the shift lever is actuated. Step 408, represents one more test of the ignition signal. If the ignition signal is "ON", the control device of the automated clutch sends signals on the CAN bus in step 409. In the negative case of step 408, the control device of the automated clutch is blocked from sending signals in step 410, which means that the starter is not released to start the engine.

FIG. 2
101 Ignition
102 AK control (automatic clutch control)
104 Engine control
106 ABS control
108 Other control devices FIG. 3
202 Engine control emitting?
204 Engine speed >200 1/min
209 Ignition signal or B_MOT_DREHT=1
210 Ignition=ON
211 Ignition=OFF
212 If ignition=ON: normal driving state
    If ignition=OFF: Parking lock
Ja/Nein Yes/no FIG. 4
252 Engine control emitting?
255 Ignition signal or B_MOT_AKTIV=1
256 Ignition=ON
257 Ignition=OFF
258 If ignition=ON : Normal driving state
    If ignition=OFF Parking lock
Ja/Nein Yes/no FIG. 5
302 Ignition signal or B_MOT_DREHT 1
303 AK control emitting
304 Starter release
305 Engine start
306 AK not emitting
307 No starter release
308 No engine start FIG. 6
352 Ignition signal or B_MOT_AKTIV=1
353 AK control emitting
354 Starter release
355 Engine start
356 AK not emitting
357 No starter release
358 No engine start FIG. 7
402 Replacement ignition signal=ON
403 Replacement ignition signal OFF
404 Ignition signal=ON or
Replacement ignition signal ON
405 Ignition ON
406 Ignition=OFF
407 Sequence:
  Ignition=ON: Driving, coasting (SA active)
  Ignition=OFF: Parking lock (SA not active)
408 Ignition signal=ON
409 AK emitting on CAN
410 AK NOT emitting on CAN (no starter release)

What is claimed is:

1. A motor vehicle with a drive train comprising an engine, a transmission, and an automated clutch, with a clutch control device for controlling the automated clutch and with a unit for determining an engine rpm-rate $n_{mot}$, wherein the clutch control device is activated by means of an activation element which, when the ignition is switched on, sends an ignition signal $V_Z$ to the clutch control device, and wherein in the absence of the ignition signal at the clutch control device, the clutch control device remains activated if an engine rpm signal $n_{mot}$ which lies above a predetermined rpm-limit $n_{limit}$ is present at the clutch control device.

2. A motor vehicle with a drive train comprising an engine, a transmission, and an automated clutch, with a clutch control device for controlling the automated clutch and with at least a further control device, wherein at least the clutch control device and the further control device are activated by means of an activation element which, when the ignition is switched on, sends an ignition signal $V_Z$ to the clutch control device, and wherein in the absence of the ignition signal at the clutch control device, the clutch control device remains activated if the clutch control device receives from the further control device a signal indicating that the ignition signal $V_Z$ is present at the further control device.

3. A motor vehicle with a drive train comprising an engine, a transmission, and an automated clutch, with a clutch control device for controlling the automated clutch and with at least a further control device, wherein at least the clutch control device and the further control device are activated by means of an activation element which, when the ignition is switched on, sends an ignition signal $V_Z$ to the clutch control device, and wherein in the absence of the ignition signal at the clutch control device, the clutch control device is or remains activated if at the clutch control device there is a signal from the further control device which indicates an activation of the further control device.

4. A motor vehicle with a drive train comprising an engine, a transmission, and an automated clutch, with a clutch control device for controlling the automated clutch and with at least a further control device, wherein at least the clutch control device and the further control device are activated by means of an activation element which, when the ignition is switched on, sends an ignition signal $V_Z$ to at least the clutch control device and to the further control device, and wherein the clutch control device is or remains activated in the presence of at least one of the ignition signal $V_Z$ and an engine rpm-signal indicating an engine rpm-rate $n_{mot}$ above an rpm-limit $n_{limit}$.

5. A motor vehicle with a drive train comprising an engine, a transmission, and an automated clutch, with a clutch control device for controlling the automated clutch and with at least a further control device, wherein at least the clutch control device and the further control device are activated by means of an activation element which, when the ignition is switched on, sends an ignition signal $V_Z$ to at least the clutch control device and to the further control device, and wherein the clutch control device is or remains activated in the presence of at least one of the ignition signal $V_Z$ and an activity signal of the further control device.

6. The motor vehicle according to claim 5, wherein at least the clutch control device in the activated state sends signals through a data bus.

7. The motor vehicle according to claim 5, wherein at least the clutch control device with the presence of said activity signal of said further control device sends signals through a data bus.

8. The motor vehicle according to claim 5, wherein at least the clutch control device with the presence of an engine rpm-signal indicating an engine rpm-rate above an rpm-limit sends signals through a data bus.

9. The motor vehicle according to claim 6, wherein the clutch control device, when neutral is engaged in the transmission, sends a starter release signal through the data bus.

10. The motor vehicle according to claim 9 wherein the at least one further control device comprises an engine control device, and wherein said engine control device starts up the vehicle engine with the presence of the starter release signal and an engine start operation initiated by the driver.

11. The motor vehicle according to claim 5, wherein the further control device comprises one of:
  a control device of an engine control;
  a control device of a transmission control;
  a control device of an anti-slip regulation;
  a control device of an anti-lock braking system;
  a control device of a traction control regulator;
  a control device of a climate control system;
  a control device of a navigation system; and
  a control device of an anti-slip regulation.

12. The motor vehicle according to claim 5, wherein the further control device is an electronic control device with a microprocessor.

13. The motor vehicle according to claim 5, wherein the activity signal is transmitted on a data bus connection.

14. The motor vehicle according to claim 5, wherein the activity signal is transmitted on a CAN bus connection.

15. The motor vehicle according to claim 5, wherein at least one of the following is used as activation element:
  an ignition switch for switching on the ignition of the vehicle;
  a vehicle brake operating element;
  a transponder code card.

16. The motor vehicle according to claim 5, wherein the clutch control device controls the engagement of the clutch prior to deactivation of the clutch control device.

17. The motor vehicle according to claim 16, wherein a variable predeterminable length of time lies between the engagement of the clutch and the deactivation of the clutch control device.

18. The motor vehicle according to claim 5, wherein the activity signal comprises one of:
  an activity signal of the further control device
  an engine rpm-rate signal $n_{mot}$
  a throttle valve signal
  a fuel injection rate signal
  an engine torque signal $M_{mot}$
  a wheel rpm-rate signal $n_{rad}$
  a transmission rpm-rate signal $n_{trsm}$.

19. A method for controlling an automated clutch in a drive train of a motor vehicle with at least one clutch control device for controlling the automated clutch and a further control device, wherein said control devices are activated with the operation of an activation element for switching on and deactivated with an operation for switching off, wherein the method comprises:

interrogating whether an ignition signal or an engine rpm-rate signal is present at the clutch control device;

with the presence of at least one of the ignition signal and the engine rpm-rate signal, leaving the clutch control device activated;

with the absence of the ignition signal and the engine rpm-rate signal, sending no signals from the clutch control device through a data bus;

with the absence of the ignition signal and the engine rpm-rate signal, deactivating the clutch control device.

20. A method for controlling an automated clutch in a drive train of a motor vehicle with at least one clutch control device for controlling the automated clutch and a further control device, wherein said control devices are activated with the operation of an activation element for switching on and deactivated with an operation for switching off, wherein the method comprises:

interrogating whether at least one of an ignition signal, an engine rpm-rate signal and an engine control activity signal exists at the clutch control device;

with the presence of at least one of the ignition signal, the engine rpm-rate signal and the engine control activity signal, leaving the clutch control device activated;

with the absence of the ignition signal and the engine rpm-rate signal or the ignition signal and the engine control activity signal, sending no signals from the clutch control device through a data bus;

with the absence of the ignition signal and the engine speed signal or the ignition signal and the engine control activity signal, deactivating the clutch control device.

21. The method according to claim 19, wherein prior to deactivation of the clutch control device the clutch is engaged.

22. The method according to claim 19, wherein a waiting time is observed prior to the deactivation of the control device.

23. The method according to claim 21, wherein a waiting time is observed prior to the engagement of the clutch.

24. A motor vehicle having a plurality of control devices which are activated by an activation element sending an ignition signal $V_Z$, wherein said plurality of control devices are in signal connection with each other and mutually monitor each other, and wherein of said plurality of control devices at least one control device is not deactivated in the absence of the ignition signal $V_Z$ if the ignition signal $V_Z$ is present in at least one other control device, or if a signal that is different from the ignition signal but is indicative of the presence of the ignition signal is present at the at least one control device.

* * * * *